United States Patent
Zou et al.

(10) Patent No.: US 12,468,724 B2
(45) Date of Patent: Nov. 11, 2025

(54) DATA PROCESSING METHOD, APPARATUS, AND DEVICE, AND STORAGE MEDIUM

(71) Applicants: CONTEMPORARY AMPEREX FUTURE ENERGY RESEARCH INSTITUTE (SHANGHAI) LIMITED, Shanghai (CN); CONTEMPORARY AMPEREX TECHNOLOGY CO., LIMITED, NIngde (CN)

(72) Inventors: Zhenpeng Zou, Shanghai (CN); Kuilong Zhu, Shanghai (CN)

(73) Assignees: CONTEMPORARY AMPEREX FUTURE ENERGY RESEARCH INSTITUTE (SHANGHAI) LIMITED, Shanghai (CN); CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/746,491

(22) Filed: Jun. 18, 2024

(65) Prior Publication Data

US 2024/0419682 A1    Dec. 19, 2024

(30) Foreign Application Priority Data

Jun. 19, 2023 (CN) .......................... 202310733508.1

(51) Int. Cl.
*G06F 16/25* (2019.01)
*G06F 16/178* (2019.01)
*G06F 16/23* (2019.01)

(52) U.S. Cl.
CPC ........ *G06F 16/258* (2019.01); *G06F 16/1794* (2019.01); *G06F 16/23* (2019.01); *G06F 16/25* (2019.01)

(58) Field of Classification Search
CPC .... G06F 16/258; G06F 16/23; G06F 16/1794; G06F 16/25
See application file for complete search history.

(56) References Cited

U.S. PATENT DOCUMENTS

2006/0236254 A1 * 10/2006 Mateescu .................. G06F 8/75
                                                          715/762
2008/0016170 A1 * 1/2008 MacKelprang ...... G06Q 10/107
                                                          709/206

(Continued)

FOREIGN PATENT DOCUMENTS

CN     113805867 A     12/2021
CN     115543960 A     12/2022

OTHER PUBLICATIONS

The European Patent Office (EPO) The Extended European Search Report for Application No. 24182693.2 Nov. 20, 2024 8 Pages.

*Primary Examiner* — Kavita Stanley
*Assistant Examiner* — Lin Lin M Htay
(74) *Attorney, Agent, or Firm* — ANOVA LAW GROUP, PLLC (57) ABSTRACT

A data processing method implemented based on a data processing system. The data processing system includes an access layer, a configuration layer, and a data layer. The method includes: accessing, through the access layer, data under processing; obtaining, through the access layer, a message parsing script set by the configuration layer, and converting the data under processing into standard data; and obtaining, through the data layer, a device model set by the configuration layer, and mapping the standard data to a data table corresponding to the device model.

14 Claims, 6 Drawing Sheets

(56) References Cited

U.S. PATENT DOCUMENTS

2020/0328948 A1* 10/2020 Nayyar ............... H04L 41/0803
2021/0105349 A1* 4/2021 Rodrigues ............... H04L 69/03
2021/0211509 A1 7/2021 Ly et al.

* cited by examiner

DATA PROCESSING METHOD, APPARATUS, AND DEVICE, AND STORAGE MEDIUM

CROSS-REFERENCE TO RELATED APPLICATION

This application claims priority to Chinese Application No. 202310733508.1, filed on Jun. 19, 2023, the entire content of which is incorporated herein by reference.

TECHNICAL FIELD

This application relates to the field of data processing, and in particular, to a data processing method, apparatus, and device, and a storage medium.

BACKGROUND

With the development of new energy technologies, battery technologies have been widely applied. To better optimize battery performance or monitor the usage status of batteries, a large amount of battery data is collected during the production or use of batteries.

Due to the diversity of data standards, including national standards, enterprise standards, custom standards, and the like, the content of the collected battery data is varied. The data content of different standards varies greatly and therefore cannot be effectively used for generating data that can be used downstream.

SUMMARY

In view of this, embodiments of this application provide a data processing method, apparatus, and device, and a storage medium, so as to solve the problem in the related art that due to the diversity of data standards, the content of the collected battery data is varied, and the data content of different standards varies greatly, which cannot be effectively used for generating data that can be used downstream.

A first aspect of the embodiments of this application provides a data processing method implemented based on a data processing system, where the data processing system includes an access layer, a configuration layer, and a data layer. The method includes: accessing, through the access layer, data under processing; obtaining, through the access layer, a message parsing script set by the configuration layer, and converting the data under processing into standard data; and obtaining, through the data layer, a device model set by the configuration layer, and mapping the standard data to a data table corresponding to the device model.

For the data under processing accessed by the access layer, message parsing is performed using the message parsing script set by the configuration layer, so as to obtain standard data corresponding to the data under processing of different standards, thereby being able to adapt to the processing requirements of data of different standards. The data layer maps the standard data to the data table corresponding to the data model according to the device model set by the configuration layer, so that the standard data converted from data of different standards can be mapped to data that is convenient for downstream use. For data of different standards, it is only needed to update the device model in the configuration layer accordingly, and then the data parsed can be mapped from the corresponding data table, which is beneficial to improve the convenience of using data downstream.

In conjunction with the first aspect, in a first possible implementation of the first aspect, before the mapping the standard data to a data table corresponding to the device model, the method includes: obtaining a change message of the device model through the data layer; and updating, through the data layer, the data table corresponding to the device model according to a change relationship between the change message of the device model and the existing device model, where the data table is used for mapping the standard data.

When standard data is mapped to the data layer, it is needed to set the data table corresponding to the data under processing so as to accurately and effectively map the data under processing to the data layer. After the configuration layer releases the device model, the device model can be converted into data defined in JSON (with a full name in English of JavaScript Object Notation) format, including data in the form of the TSL (Things Specification Language), and the converted data is sent to the data layer. The data layer can update the data table in the data based on the change message of the device model, so that the updated data table matches the changed device model, thereby facilitating the mapping of the data obtained by the access layer to the data layer.

In conjunction with the first possible implementation of the first aspect, in a second possible implementation of the first aspect, the updating, through the data layer, the data table corresponding to the device model according to a change relationship between the change message of the device model and an existing device model includes: determining, through the data layer, the change relationship between the change message of the device model and the existing device model; and when the change message of the device model is a change message of the existing device model, adding a new field in an existing model table based on the change message of the device model through the data layer, where the existing model table is a data table mapped from the existing model; or when the change message of the device model is a change message of an unknown device model, creating a data table based on the change message of the device model through the data layer, or determining a new field based on the change message of the device model, and updating the data table according to the new field.

When the data under processing obtained is mapped through the data layer, the change message of the device model can be sent to the data layer according to the device model set by the setting layer. Based on the change message of the device model, the data layer determines the data table corresponding to the changed device model. If the change message of the device model is a change message of an existing device model, a new field can be added to the existing model table mapped from the existing model to obtain an updated data table. If the change message of the device model is a change message of an unknown device model, a new data table can be created, or the fields in the change message of the device model can be determined, compared with the existing data table to determine the new fields in the existing data table, and the data table can be updated according to the new fields to obtain the data table corresponding to the device model.

In conjunction with the second possible implementation of the first aspect, in a third possible implementation of the first aspect, after the determining, through the data layer, the change relationship between the change message of the device model and the existing device model, the method further includes: when fields included in the change message of the device model are inherited from a basic model, adding a new field in a basic model table based on the change message of the device model through the data layer.

In order to obtain the data table corresponding to the device model more quickly, after the change message of the device model is compared with the existing device model, it can be first determined whether the fields included in the change message of the device model are inherited from the basic model. If these fields are inherited from the basic model, a new field can be directly added to the basic model table to quickly obtain the data table corresponding to the change message of the device model.

In conjunction with the second possible implementation of the first aspect, in a fourth possible implementation of the first aspect, after the obtaining a change message of the device model through the data layer, the method further includes: determining a type of the change message of the device model based on a data identifier in the change message of the device model.

Since the device model includes at least one of a device attribute model, a device event model, and a device measurement data model. Different types of device model change messages correspond to different data tables. In order to accurately map the accessed data to the data layer, data tables can be set separately according to different types of device models. For example, the data table can include at least one of a device attribute table, a device event table, and a device measurement data table.

In conjunction with any one of the first to fourth possible implementations of the first aspect, in a fifth possible implementation of the first aspect, the obtaining, through the access layer, a message parsing script set by the configuration layer, and converting the data under processing into standard data includes: identifying, through the access layer, a message header and message body in the data under processing; converting, through the access layer, a message header and message body of the identified data according to the message parsing script set by the configuration layer; and obtaining, through the access layer, the standard data based on the converted message.

To convert the data under processing into standard data, the data under processing is first identified and converted to obtain a corresponding message header and message body. According to a message header conversion script included in the message parsing script set by the configuration layer, the message header in the data under processing is converted. According to a message body parsing script in the message parsing script set by the configuration layer, the message body in the data under processing is converted. The standard data is obtained based on the converted message header and message body.

In conjunction with the fifth possible implementation of the first aspect, in a sixth possible implementation of the first aspect, the obtaining the standard data based on the converted message through the access layer includes: obtaining, through the access layer, a constraint rule set by the configuration layer; and validating, through the access layer according to the constraint rule, the data under processing, and determining the standard data based on data that passes the validation.

In order to improve data processing efficiency, before mapping the data, the constraint rule set by the configuration layer can also be obtained to validate the data under processing obtained by the access layer. For a battery data scenario, the validation content can include: validation of integer, single-precision floating-point, and double-precision floating-point data, mainly verifying whether the actual data type is consistent and whether the maximum and minimum values meet the requirements. Validation of enumeration and boolean data can include verifying whether the actual data is included within a defined range. Time-type data can include validating whether the time format conforms to a predefined format (timestamp and custom time format). Structure data can include validating whether it is data in a data structure such as JSON.

In conjunction with the fifth possible implementation of the first aspect, in a seventh possible implementation of the first aspect, after the identifying, through the access layer, a message header and message body in the data under processing and before the converting, through the access layer, a message header and message body in the identified data according to the message parsing script set by the configuration layer, the method further includes: obtaining, through the access layer, a routing rule for different versions of the message parsing script set by the configuration layer; and routing, through the access layer according to the routing rule, the data under processing to a corresponding version of the message parsing script for parsing.

In order to effectively process data while reducing the loss caused by errors in data processing due to new versions of message parsing scripts, different versions of message parsing scripts can be set with corresponding routing, and different data under processing can be sent to different message parsing scripts for parsing. For example, a first range of data under processing can be routed to a first version of the message parsing script, and a second range of data under processing can be routed to a second version of the message parsing script. After the stability and reliability of the new version of the message parsing script are determined, the amount of data processed by routing to the new version of the message parsing script can be increased.

In conjunction with the seventh possible implementation of the first aspect, in an eighth possible implementation of the first aspect, the routing rule includes a HASH (hash) value routing rule and/or a whitelist routing rule; and the routing, through the access layer according to the routing rule, the data under processing to a corresponding version of the message parsing script for parsing includes: determining, through the access layer based on a numerical range of the HASH value of the predetermined field in the data under processing, a corresponding version of the message parsing script for the data under processing; or, determining, through the access layer based on a whitelist corresponding to the version of the message parsing script, a corresponding version of the message parsing script for the data under processing.

When data is routed to different versions of message parsing scripts, whitelists and/or blacklists corresponding to different versions of message parsing scripts can be determined by setting whitelists and/or blacklists, and data under processing in the whitelist can be routed to the corresponding version of the message parsing script. Alternatively, specific fields in the data under processing, including device identifiers, can be HASHed to obtain data within a predetermined range, and routed to a corresponding version of the message parsing script for parsing.

In conjunction with the first to eighth possible implementations of the first aspect, in a ninth possible implementation of the first aspect, the accessing, through the access layer, data under processing includes: accessing the data under processing, through the access layer by using at least one of the following access methods: http (with a full name in English of Hyper Text Transfer Protocol) protocol adaptation, csv import, mq (with a full name in English of Message Queue) real-time message access, oss (with a full name in English of Object Storage Service) docking, MinIO (an object storage service based on the Apache License v2.0 open source protocol) docking, and ftp (with a full name in English of File Transfer Protocol) docking.

Setting multiple data access methods in the access layer allows for effective adaption to the docking of data with different access methods, including http access gateway to complete http protocol data access, mq message middleware to complete mq message access, and offline import to adapt csv data import. Setting a corresponding adaptation module, or data extraction allows for effective docking with the data under processing with various access methods.

A second aspect of the embodiments of this application provides a data processing apparatus implemented based on a data processing system, where the data processing system includes an access layer, a configuration layer, and a data layer. The apparatus includes: an access unit, configured to access through the access layer, data under processing; a parsing unit, configured to: obtain, through the access layer, a message parsing script set by the configuration layer, and convert the data under processing into standard data; and a mapping unit, configured to: obtain, through the data layer, a device model set by the configuration layer, and map the standard data to a data table corresponding to the device model.

A third aspect of the embodiments of this application provides a data processing device including a memory, a processor, and a computer program stored in the memory and capable of running on the processor, where when the computer program is executed by the processor, the steps of the method according to any one of the implementations of the first aspect are implemented.

A fourth aspect of the embodiments of this application provides a computer-readable storage medium, where the computer-readable storage medium stores a computer program, and when the computer program is executed by a processor, the steps of the method according to any one of the implementations of the first aspect are implemented.

It can be understood that for the beneficial effects of the second to fourth aspects, reference may be made to the relevant descriptions of the first aspect, which are not repeated herein.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some of the embodiments of this application, and persons of ordinary skill in the art may still derive other drawings from these accompanying drawings without creative efforts.

DESCRIPTION OF EMBODIMENTS

In the following description, specific details such as particular system structures and technologies are provided for the purpose of explanation rather than limitation, to facilitate a thorough understanding of the embodiments of this application. However, it will be clear to those skilled in the art that this application can be implemented in other embodiments without these specific details. In other instances, detailed descriptions of well-known systems, devices, circuits, and methods are omitted so as not to obscure the description of this application with unnecessary details.

In this disclosure, the phrases "at least one of A, B, and C" and "at least one of A, B, or C" both mean only A, only B, only C, or any combination of A, B, and C.

To illustrate the technical solutions described in this application, the following description will be made through specific examples.

Figure 1:
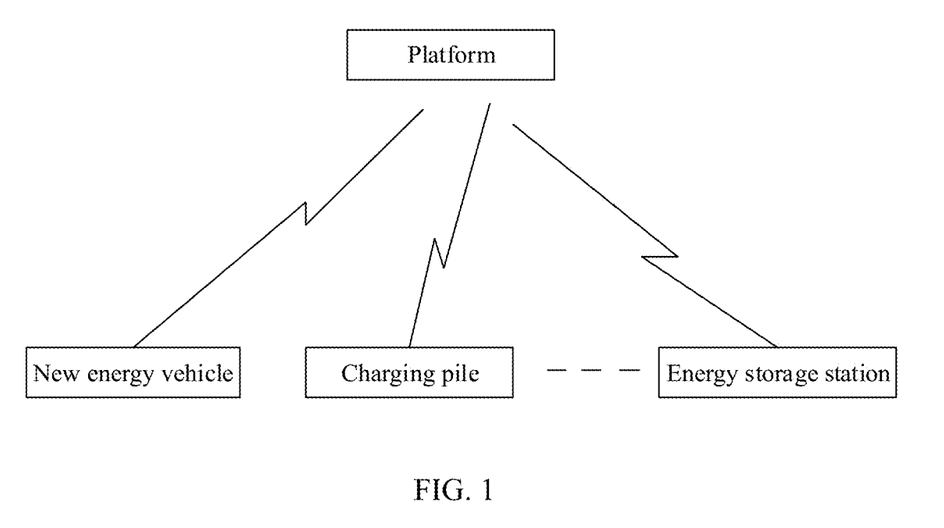
FIG. 1 is a schematic diagram of an application scenario of a data processing method according to an embodiment of this application.

FIG. 1 is a schematic diagram of an application scenario of a data processing method according to an embodiment of this application. As shown in FIG. 1, the data under processing includes battery data, and in the application scenario for processing battery data, a data terminal and a platform are included. The data terminal is used to collect data under processing and can include new energy vehicles, charging piles, energy storage stations, or other devices powered by batteries. The platform can dock with data of various different access methods through multiple data access methods set up by the access layer. The data accessed by the access layer is parsed through the message parsing script set by the configuration layer, and the collected data is processed into standard data. Through the device model set by the configuration layer, the data table in the data layer is updated by the change message of the device model, making it convenient to effectively map the data accessed by the access layer to the data layer after parsing, facilitating subsequent use.

Figure 2:
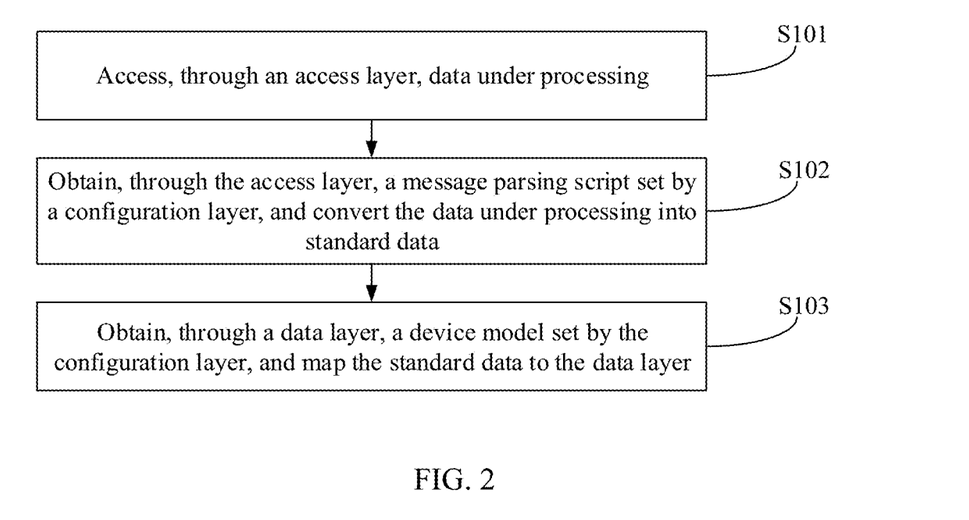
FIG. 2 is a schematic implementation flowchart of a data processing method according to an embodiment of this application.

FIG. 2 is a schematic implementation flowchart of a data processing method according to an embodiment of this application. The method is implemented based on a data processing system, where the data processing system includes an access layer, a configuration layer, and a data layer, detailed as follows:

S101. Access, through the access layer, data under processing.

Specifically, in this embodiment of this application, the data under processing can include data from various different docking scenarios. For example, the data under processing can include http protocol format data accessed based on the http protocol, mq real-time messages accessed based on mq message middleware, csv data imported based on offline data, as well as data imported based on object storage services OSS, distributed file storage service MinIO, and file transfer protocol ftp, and the like.

Different data access modules are adapted to in the access layer, including at least one of http protocol adaptation module, mq message middleware, csv import module, and OSS/MinIO/ftp docking module, to correspondingly access the http protocol data, mq messages, csv offline data, and data accessed based on OSS/MinIO/ftp.

In a possible implementation, new adaptation protocols or components can also be added through the configuration layer, so that the access layer can adapt to the docking of data from newly added access methods.

S102. Obtain, through the access layer, a message parsing script set by the configuration layer, and convert the data under processing into standard data.

In this embodiment of this application, the configuration layer can set the corresponding message parsing script according to field information included in the data under processing accessed by the access layer. The data under processing is parsed through the message parsing script to obtain standard data that can be mapped to the data layer.

The message parsing script configuration module in the configuration layer can configure the message parsing script. The message parsing script configuration module can include functional modules such as a script content module, a script verification module, a script debugging module, a script compilation module, a script version module, and a grayscale configuration module.

The script content module can include a message header conversion method and a message body conversion method. The script content module can convert the message header and message content in the data under processing according to the message header conversion method and the message conversion method. For example, the accessed data under processing can be converted into a standard format of message header and message body, the message header is converted through the message header conversion method, and the message body is converted through the message body conversion method.

Message header conversion can be understood as mapping the key (key) in the data under processing to the attribute key (key) in the attribute fields of the device model set by the configuration layer. Message body conversion can be understood as converting the value (value) in the data under processing into the value (value) in the attribute fields of the device model set by the configuration layer.

Message body conversion includes, but is not limited to, operations such as multiplying the data by a factor, dividing the data by a factor, adding a constant value, or subtracting a constant value. For instance, if the unit of a numerical value in the data under processing differs from the unit of a numerical value in the set device model, including differences in voltage units or current units, it is needed to multiply or divide the data by a factor. If the reference point for the data is different, it may be needed to adjust the data by adding or subtracting a constant value. The method for converting the message body in the message parsing script can be set through the configuration layer based on the format of the accessed data under processing, the standard data, and the requirements of the measurement standards.

The script verification module can be used for basic syntax verification. If the syntax verification in the script content does not pass, data cannot be successfully submitted. The configuration layer can set the verification rules and logic of the script syntax structure to automatically verify the script content.

The script compilation module can be used to compile the edited script into a binary executable file to improve efficiency during execution.

The script version module can be used for the management of new and old versions. When a user needs to upgrade the script in the production environment, the user edits the already published script. The version management system will generate a new script version based on the content of the latest published version of the script, the new generated script version is in draft status, and the version number is incremented by 1 based on the original. After the user completes the logic editing of the script based on the newly generated script, and completes debugging and compiling of the script, the latest version can be published.

The grayscale configuration module is used to complete the filtering and distribution of traffic between different versions. The version of the message parsing script to which the data under processing is routed can be determined based on the HASH modulo value of the predetermined field in the data under processing. Users can route the HASH value of the predetermined field to a specified version of the message parsing script by configuring the predetermined field HASH routing rule, such as routing to the latest version of the message parsing script, thereby completing the comparative testing of the new and old scripts, and ultimately achieving a smooth launch of the script.

In a possible implementation, for the same HASH result, such as belonging to a predetermined numerical range, it can be routed to one or more versions of the message parsing script. When two or more message parsing scripts are used to parse the data under processing at the same time, the accuracy and reliability of the new version of the message parsing script can be determined based on the comparison of the parsing results.

In a possible implementation, blacklists or whitelists of data terminal identifiers corresponding to different versions of message parsing scripts can also be set. In a case that the data terminal identifier of the data under processing belongs to the whitelist of the version of the message parsing script, it is allowed to route the data under processing to that message parsing script. In a case that the data terminal identifier of the data under processing belongs to the blacklist of the version of the message parsing script, it is forbidden to route the data under processing to that message parsing script.

Figure 3:
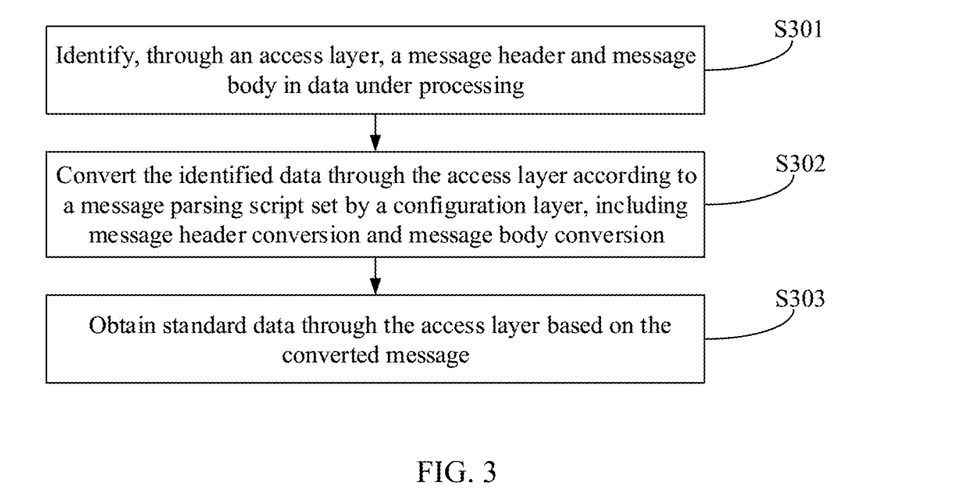
FIG. 3 is a schematic implementation flowchart of a message conversion method according to an embodiment of this application.

The process of obtaining the message parsing script set by the configuration layer through the access layer and converting the data under processing into standard data can include the following steps, as shown in FIG. 3.

S301. Identify, through the access layer, a message header and message body in the data under processing.

The message header and message body in the data under processing can be determined based on the format of the data under processing. The message header refers to the key (key) included in the data under processing, and the message body refers to the value (value) included in the data under processing. The message header and message body in the data under processing can be determined based on the data format defined by the data collection system of different data terminals.

S302. Convert the identified data through the access layer according to the message parsing script set by the configuration layer, including message header conversion and message body conversion.

After the message header and message body in the data under processing are determined, the data can be converted through the message header conversion method and message body conversion method in the message parsing script obtained from the configuration layer. That is, the message header in the data under processing after conversion is converted into the message header of the device model. For fields that cannot be found in the message parsing script, the message header in the data under processing is passed down as is.

For conversion of the message body, the message body conversion method in the message parsing can be used to convert the message body of the data under processing by methods such as magnifying multiples, reducing multiples, reducing constant values, or adding constant values, into the message body of the device model.

S303. Obtain the standard data through the access layer based on the converted message.

The standard data includes data that can be used for mapping to the device model set by the configuration layer.

Figure 4:
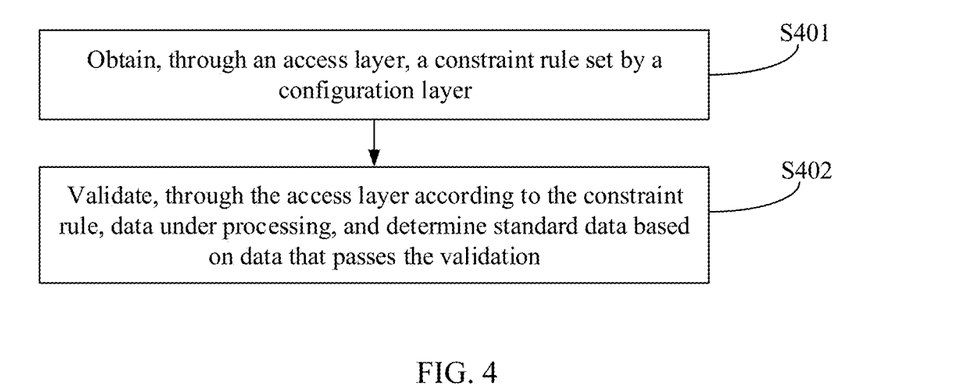
FIG. 4 is a schematic implementation flowchart of a method for generating standard data according to an embodiment of this application.

In order to improve the reliability and efficiency of data mapping, during generation of standard data, the following steps can also be included, as shown in FIG. 4.

S401. Obtain, through the access layer, a constraint rule set by the configuration layer.

The attribute types in the attribute fields of the device model include at least one of integer type, single-precision floating-point type, double-precision floating-point type, enumeration type, boolean type, string, time type, and structure. The constraint rule set by the configuration layer can include constraint rules for attribute fields.

Different constraint rules apply to different field types. For the battery data scenario, the main constraint rules are as follows.

For integer, single-precision floating-point, and double-precision floating-point data, the constraint rule includes verifying whether the actual data type is consistent, and whether the maximum and minimum values meet the requirements.

For enumeration and boolean data, the constraint rule includes verifying whether the actual data is included within the defined range.

For time-type data, the constraint rule includes verifying whether the time format conforms to the predefined format (timestamp and custom time format).

For structure data, the constraint rule includes verifying whether it is JSON-structured data.

S402. Validate, through the access layer according to the constraint rule, the data under processing, and determine the standard data based on data that passes the validation.

Validity verification on the data under processing is performed according to the constraint rule of the attribute fields defined by the device model configured by the configuration layer. For data that does not pass the validation, a dirty data label can be set. The set data label can facilitate subsequent mapping processing. For example, it is possible to prevent data under processing with a dirty data label from being mapped to the data layer, improving data processing efficiency.

When the configuration layer sets or defines a device model, it sends a change message notification to the access layer. When receiving the change message notification, the access layer can update the locally cached device model according to the method shown in FIG. 5.

Figure 5:
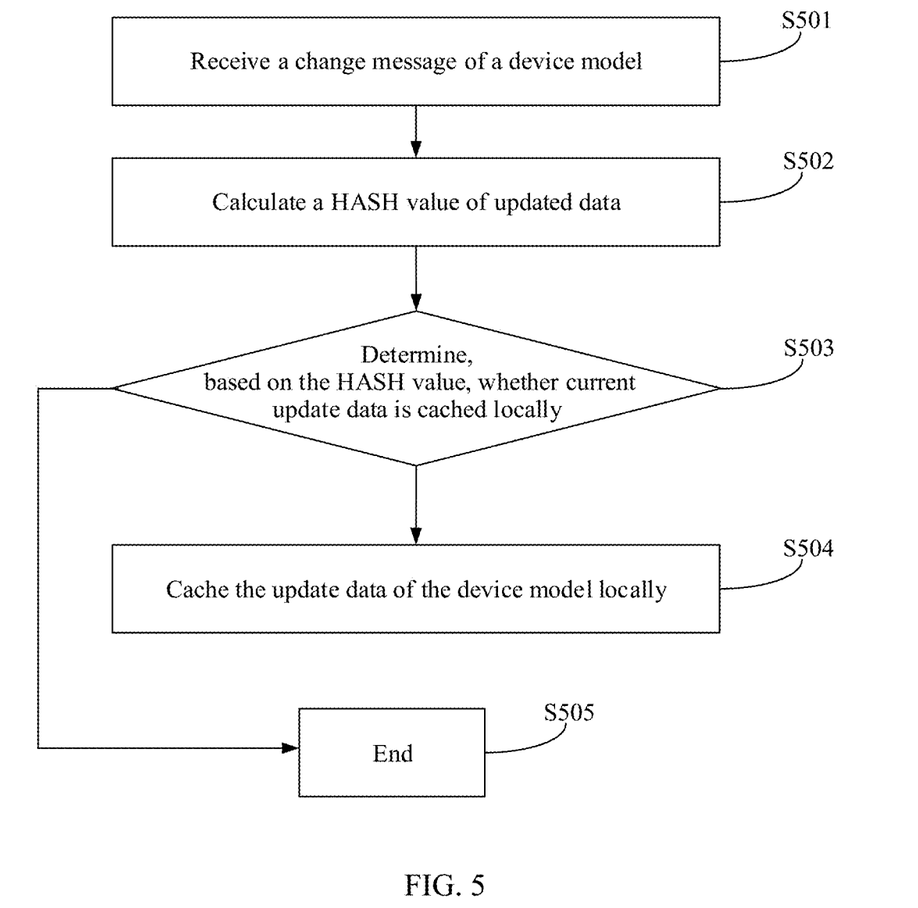
FIG. 5 is a schematic implementation flowchart of a method for updating a device model according to an embodiment of this application.

S501. Receive a change message of the device model.

The configuration layer can receive user configuration information. This configuration information can include configuration information of field attributes of the device model. After a user completes the configuration of the device model, the configuration can be uploaded to the platform, and the change message of the device model can be sent to the access layer or data layer. In this case, the access layer or data layer can receive the change message of the device model sent by the configuration layer. For example, the access layer can receive configuration information about a message parsing script in the change message of the device model, and the data layer can receive field information in the device model, and update a data table based on the field information.

S502. Calculate a HASH value of updated data.

The overall data HASH value of the change message of the device model can be calculated. Since the HASH corresponds one-to-one with the data content, when the change message changes, a corresponding HASH value also changes.

S503. Determine, based on the HASH value, whether current update data is cached locally.

The HASH value of the locally cached data can be compared with the HASH value of the device model of the change message currently received to determine whether the two are consistent.

S504. Cache the update data of the device model locally if the current update data is not cached locally.

If the HASH value of the device model corresponding to the change message received is different from the HASH value of the device model cached locally, due to the one-to-one correspondence between the HASH value and the device model, it indicates that the device model corresponding to the change message sent by the configuration layer is not cached locally, then data of the device model corresponding to the change message can be cached to the access layer.

S505. End this update if the current update data is already cached locally.

If the HASH value of the change message of the device model received is the same as the HASH value of the device model cached locally, it indicates that the device model corresponding to the change message sent by the configuration layer is already cached locally.

Figure 6:
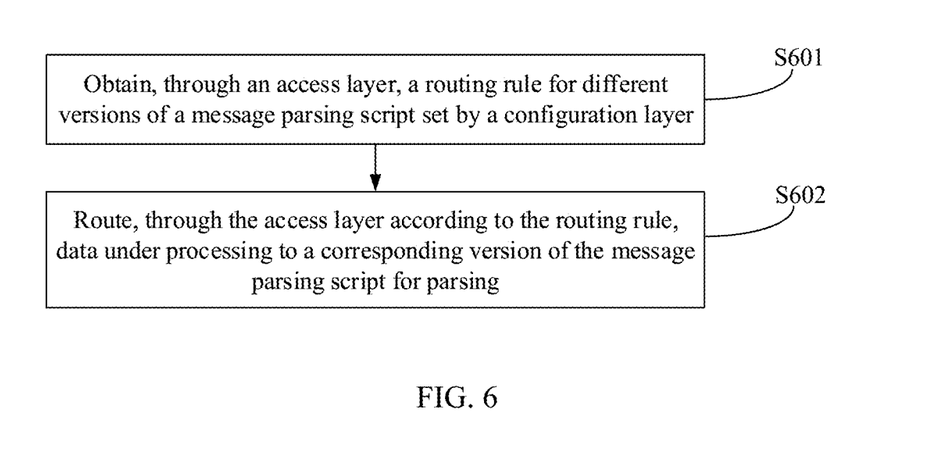
FIG. 6 is a schematic implementation flowchart of a method for determining routing of a message parsing version according to an embodiment of this application.

In addition, when the device model of a new version processes data, there may be defects or vulnerabilities. In order to reduce the problems of data errors caused by the new version of the device model during data processing, parsing can be performed through the method of grayscale configuration, as shown in FIG. 6, the method of parsing through grayscale configuration includes the following steps.

S601. Obtain, through the access layer, a routing rule for different versions of the message parsing script set by the configuration layer.

The routing rule refers to the path for sending the data under processing to different versions of the message parsing script. This routing rule can be set through the configuration interface of the message parsing script by the configuration layer. For example, the HASH value of the predetermined field (including data terminal identifiers and the like) of the data under processing can be calculated, and based on a data range to which the HASH value belongs, the version of the message parsing script corresponding to the data under processing can be determined. Alternatively, the version of the message parsing script corresponding to the data under processing can also be determined based on the whitelist or blacklist corresponding to different versions of the message parsing script. The same data under processing can be routed to one or more versions of the message parsing script. The same message parsing script can be used to parse one or more pieces of data under processing.

S602. Route, through the access layer according to the routing rule, the data under processing to a corresponding version of the message parsing script for parsing.

Based on the HASH value set for predetermined fields of the data under processing, or based on the whitelist or blacklist corresponding to the message parsing script, the data under processing is routed to the corresponding message parsing script for parsing, including message header parsing conversion, message body parsing conversion, and the like.

S103. Obtain, through the data layer, a device model set by the configuration layer, and map the standard data to a data table corresponding to the device model.

Figure 7:
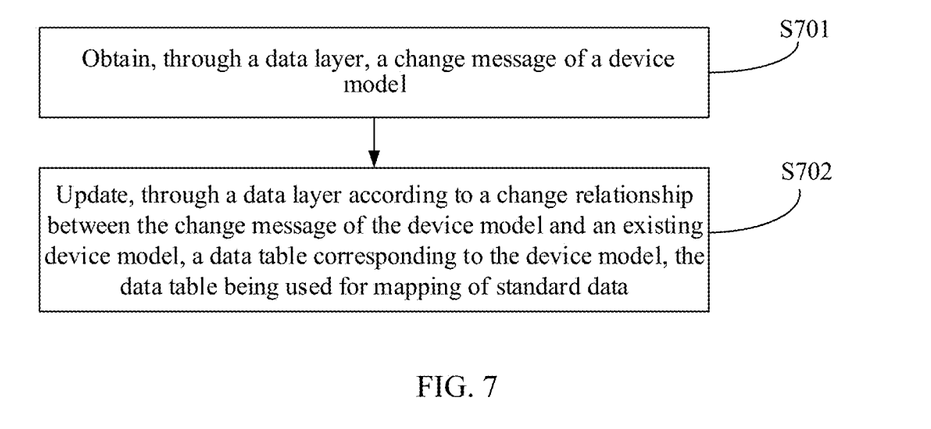
FIG. 7 is a schematic implementation flowchart of a method for updating a data table according to an embodiment of this application.

The data layer updates the data table based on the change message, which can include the following steps, as shown in FIG. 7.

S701. Obtain, through the data layer, the change message of the device model.

The configuration layer includes a device model definition interface, which can be used to define the device model. After the device model is defined in the configuration layer, a change message can be sent to the data layer. The data layer can update the data table in the data layer based on the change message.

In order to update tables in the data layer more accurately, when the change message of the device model is obtained, the type of the change message of the device model can also be determined based on a data identifier included in the change message of the device model.

For example, the type of the change message of the device model can include device attribute type, device event type, and device measurement data type.

The identifier field of the device event type can be used to distinguish different event types. For the device measurement data type, the basic model of battery data can be included, where the basic model of battery data can include basic fields defined by national standards. For example, the basic model of battery data can include at least one of device code, total voltage, cell voltage array, highest voltage, lowest voltage, highest voltage cell number, lowest voltage cell number, current, sensor temperature array, highest temperature, lowest temperature, highest temperature sensor number, lowest temperature sensor number, insulation resistance value, SOC (with a full name in English of State of Charge), accumulated mileage, vehicle status, and charging status.

The device model can be derived by extending the basic model of battery data, including at least one of a device measurement data model, a device attribute model, and a device event model.

S702. Update, through the data layer according to a change relationship between the change message of the device model and an existing device model, a data table corresponding to the device model, the data table being used for mapping of the standard data.

After receiving the change message of the device model, the data layer can update the data table corresponding to the device model according to the change relationship between the change message of the device model and the existing device model.

When the change message of the device model is a change message of the existing device model, the data layer adds a new field in the existing model table based on the change message of the device model, the existing model table being a data table mapped from the existing model.

When the change message of the device model is a change message of an unknown device model, the data layer creates a data table based on the change message of the device model, or determines a new field based on the change message of the device model, and updates the data table according to the new field.

For example, a user extends the basic model A to obtain the device model A1. If it is determined through the change message of the device model that the current change message changes corresponding to the device model A1, then based on the existing data table B1 corresponding to the existing model A1, fields corresponding to the change message can be added to the existing data table B1. If the change message is a change message of an unknown model, a data table can be created based on the fields of the change message, or new fields can be determined based on the change message, and added to the existing data table. The existing data table may include the basic model table corresponding to the basic model.

In a case that the type of the device model of the change message is the device attribute model, fields can be added directly based on the change message.

In a case that the type of the device model of the change message is the device event model, it can be determined whether the change message corresponds to a change in an existing event model. If the change message corresponds to a change in an existing event model, calculation can be performed based on the change message to determine a new field to be added to an existing event table of the existing event model and add the field to the existing event table corresponding to the existing event model. If the change message does not correspond to a change message for an existing event model, then a new data table can be created based on the change message.

In a case that the type of the device model of the change message is the device measurement data model, it can first be determined whether fields contained in the change message of the current device measurement data model are inherited from the basic model. If the fields are inherited from the basic model, then new fields can be added directly to the basic model table corresponding to the basic model to obtain a data table corresponding to the change message.

If the fields are not inherited from the basic model, it can be determined whether it is a change to an existing device measurement data model. If it is a change to the existing device measurement data model, new fields corresponding to the change message can be added to the existing data table corresponding to the existing device measurement data model.

In a case that the existing device measurement data model is updated based on the basic model, then new fields required by the change message can be added to the basic model table to obtain a data table corresponding to the change message.

In a case that the change message for the device measurement data model is for an unknown device measurement data model, fields that need to be added can be determined by comparing the change message and the existing device measurement data model table or the basic model table.

After fields in the data table in the data layer are updated through the change message of the device model, the message body of the data under processing can be accurately and effectively mapped to the data table through a mapping relationship, obtaining accurate mapping data, and data from different access methods can be uniformly stored through the data layer, which is beneficial for subsequent use of the data.

Figure 8:
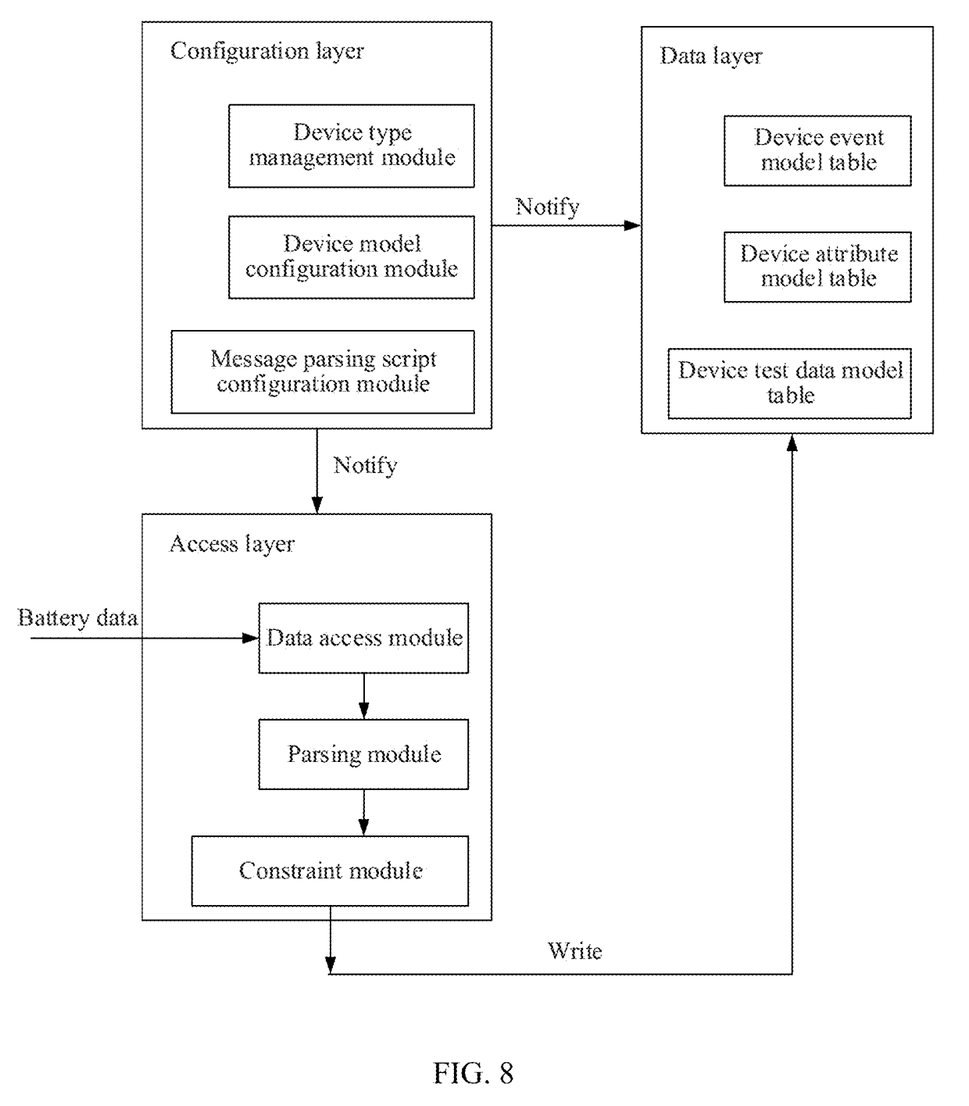
FIG. 8 is a schematic structural diagram of a platform system according to an embodiment of this application.

FIG. 8 is a schematic structural diagram of a data processing system of a platform according to an embodiment of this application. As shown in FIG. 8, the system includes an access layer, a configuration layer, and a data layer.

The configuration layer includes a device type management module, a device model configuration module, and a message parsing script configuration module.

The device type management module may manage information including the basic information, description, and tag of the device, and the like. The basic information of the device can include at least one of the device name, device creation time, and device modification time.

The device model configuration module contains at least one of the device attribute configuration module, the device measurement data configuration module, and the device event configuration module. The device model configuration module can use one or more basic attribute fields. In the device event configuration, an identifier field for the device event is included to distinguish different event types. In device measurement data configuration, the basic model of battery data is included. The basic model of battery data can include various fields defined by national standards. For example, it can include at least one of the fields such as device code, total voltage, cell voltage array, highest voltage, lowest voltage, highest voltage cell number, lowest voltage cell number, current, sensor temperature array, highest temperature, lowest temperature, highest temperature sensor number, lowest temperature sensor number, insulation resistance value, SOC, accumulated mileage, vehicle status, and charging status.

During device model configuration, any required device measurement data model can be extended based on the basic model.

In the device attribute configuration module, the attribute type can include at least one of common types such as integer, single-precision floating-point, double-precision floating-point, enumeration, boolean, string, time, and structure.

Constraint rules can be set for the device attribute fields. Different constraint rules apply to different field types. For example, for the battery data scenario, constraint rules for data of the following field types can be included: for integer, single-precision floating-point, double-precision floating-point data, whether the actual data type is consistent and whether the maximum and minimum values meet the requirements can be verified; for enumeration and boolean data, whether actual data is included within the defined range can be verified; for time-type data, whether the time format conforms to the predefined format (timestamp and custom time format) can be verified; and for structure data, whether the data is in JSON structure is mainly verified.

The above-mentioned device attributes, device measurement data, and device events can be configured to be managed based on the device model version. When the user needs to upgrade the device model definition in the production environment, the user edits the released device model, and the system will copy the content of the latest released device model definition to generate new version data of the device model definition. The newly generated version data of the device model definition is in draft status, and the version number is incremented by 1 on the original basis. After the user completes the editing of the latest device model definition, the latest version can be released.

The message parsing script configuration module mainly includes a script content module, a script verification module, a script debugging module, a script compilation module, a script version module, and a grayscale configuration module. The script content module contains methods for message header conversion and message body conversion. The function of the script content module can be used to complete data conversion of the message header and message content.

The script verification module mainly performs basic syntax verification. If the script syntax verification fails, data cannot be successfully submitted.

The script compilation module mainly completes the compilation of the edited script into a binary executable file to improve efficiency during execution.

The script version module is mainly used for the management of new and old versions. When the user needs to upgrade the script in the production environment, the user edits the released script, and the system generates a new script version based on the content of the latest released version of the script. The new script version is in draft status, and the version number is incremented by 1 on the original basis. After the user completes the editing of the script logic based on the newly generated script, and finishes the debugging and compilation of the script, the latest version can be released.

The grayscale configuration module mainly completes the capability to route traffic between different versions according to the field HASH modulo. Users can route the value of a specific field to a new version by configuring the specific field HASH routing rule, thereby completing the comparative testing of the new and old scripts, and ultimately achieving a smooth launch of the script.

The data layer is used to establish related models for the device attributes, device measurement data, and device events defined in the device model, including operations such as creating data tables and adding new fields. The created data tables include device attribute model tables, device event model tables, and device measurement data model tables, and the like.

After the user completes the configuration of the device attributes, events, and measurement data attribute fields of the device model in the configuration layer and publishes it, the configuration layer sends a change message notification of the device model to the data layer. After receiving the change message of the device model from the configuration layer, the data layer performs operations such as creating tables or adding new fields.

The access layer includes a data access module, a parsing module, and a constraint module. The data access module completes the docking of data input by adapting to http protocol, mq real-time messages, offline csv import, OSS/MinIO/ftp, data extraction, and the like. The process is mainly as follows.

After the http protocol adaptation module, mq message middleware in the mq real-time message module, csv import module, oss/MinIO/ftp docking module receive the battery data under processing, they first convert the data under processing into a standardized format of message header+ message body.

The parsing module of the access layer obtains the configuration information of the device model published in the configuration layer from the cache, obtains the grayscale configuration information for message parsing, and obtains the message parsing script configuration corresponding to the grayscale configuration information. According to the routing rules of the grayscale configuration, a corresponding version of the message parsing script for the data under processing is determined.

The message header conversion script in the message parsing script converts the message header, thereby completing the mapping from the key in the message header of the data under processing to the attribute key in the attribute field of the device model definition. Fields that cannot be found in the message header conversion script can be passed down as is.

The message body conversion script in the message script can convert the content in the message body. This includes data preprocessing work such as multiplying, reducing, adding, or subtracting some constant values.

The constraint module can perform logical verification of common fields according to the constraint rules in the attribute fields of the device model definition. Data that fails the verification can be considered as dirty data and tagged with a dirty data label, for ease of subsequent processing.

The verified data is formed into the standard data of the device model, which can be written into a corresponding data table in the data layer.

It should be understood that the numbering of the steps in the above embodiments does not imply the order of execution. The execution order of the processes should be determined by their functions and internal logic, and should not impose any limitation on the implementation process of the embodiments of this application.

Figure 9:
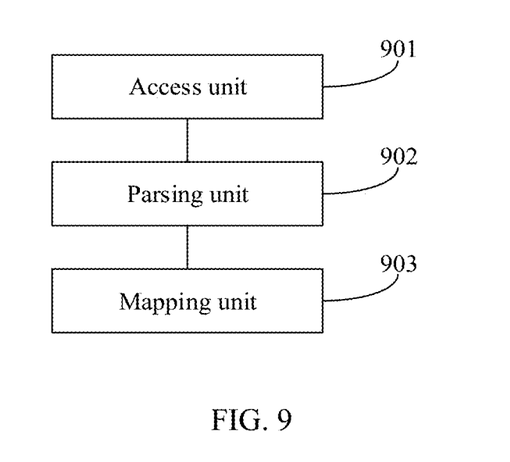
FIG. 9 is a schematic diagram of a data processing apparatus according to an embodiment of this application.

FIG. 9 is a schematic diagram of a data processing apparatus according to an embodiment of this application. As shown in FIG. 9, the apparatus includes:
 an access unit 901, configured to access, through an access layer, data under processing;
 a parsing unit 902, configured to: obtain, through the access layer, a message parsing script set by a configuration layer, and convert the data under processing into standard data; and
 a mapping unit 903, configured to: obtain, through a data layer, a device model set by the configuration layer, and map the standard data to a data table corresponding to the device model.

The data processing apparatus shown in FIG. 9 corresponds to the data processing method shown in FIG. 2.

Figure 10:
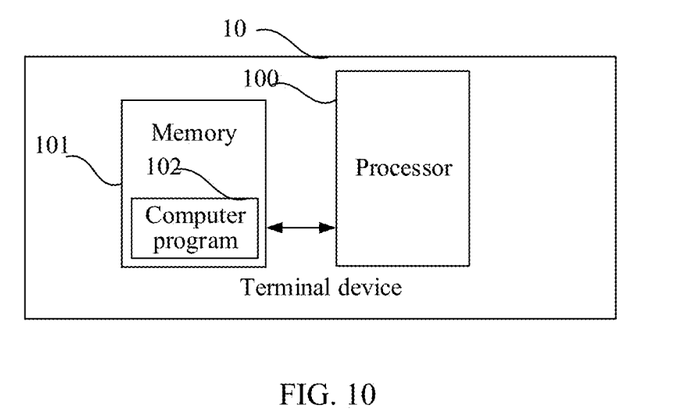
FIG. 10 is a schematic diagram of a data processing device according to an embodiment of this application.

FIG. 10 is a schematic diagram of a data processing device according to an embodiment of this application. As shown in FIG. 10, the data processing device 10 of this embodiment includes: a processor 100, a memory 101, and a computer program 102 stored in the memory 101 and capable of running on the processor 100, such as a data processing program. When the processor 100 executes the computer program 102, the steps in the various data processing method embodiments described above are implemented. Alternatively, when the processor 100 executes the computer program 102, the functions of the modules/units in the various apparatus embodiments described above are implemented.

For example, the computer program 102 can be divided into one or more modules/units, the one or more modules/units are stored in the memory 101 and executed by the processor 100 to complete this application. The one or more modules/units can be a series of computer program instruction segments capable of performing specific functions, where the instruction segments are used to describe the execution process of the computer program 102 in the data processing device 10.

The data processing device may include, but is not limited to, a processor 100, a memory 101. Those skilled in the art can understand that FIG. 10 is just an example of the data processing device 10 and does not constitute a limitation on the data processing device 10. It may include more or fewer components than shown, or combine some components, or different components, for example, the data processing device may also include input-output devices, network access devices, buses, and the like.

The processor 100 may be a central processing unit (Central Processing Unit, CPU), or may be another general-purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like.

The general-purpose processor may be a microprocessor or any regular processor.

The memory 101 can be an internal storage unit of the data processing device 10, such as the hard disk or memory of the data processing device 10. The memory 101 can alternatively be an external storage device of the data processing device 10, such as a plug-in hard disk equipped on the data processing device 10, a smart media card (Smart Media Card, SMC), a secure digital (Secure Digital, SD) card, and a flash card (Flash Card). Furthermore, the memory 101 can include both an internal storage unit and an external storage device of the data processing device 10. The memory 101 is used to store the computer program as well as other programs and data required by the data processing device. The memory 101 can also be used to temporarily store data that has been output or is about to be output.

Persons skilled in the art can clearly understand that, for ease and brevity of description, division into the foregoing function units and modules is only used as an example for description; in actual application, the foregoing functions may be allocated, depending on a requirement, to different function units and modules for implementation, that is, an internal structure of the apparatus is divided into different function units and modules to implement all or some of the functions described above. The functional units and modules in the embodiments can be integrated into a single processing unit, can exist separately as individual units, or two or more units can be integrated into a single unit. The integrated unit can be implemented in the form of hardware, or in the form of software functional units. Additionally, the specific names of the functional units and modules are only for the sake of differentiation and are not intended to limit the scope of protection of this application. For specific working process of the units and modules in the above system, reference may be made to the corresponding processes in the method embodiments described previously, which are not repeated herein.

In the above embodiments, each description of the various embodiments has its own emphasis. For parts not detailed or recorded in a certain embodiment, one can refer to the relevant descriptions of other embodiments.

Those of ordinary skill in the art can realize that the units and algorithm steps described in the various exemplary embodiments disclosed in this document can be implemented in electronic hardware, or in a combination of computer software and electronic hardware. Whether these functions are executed in hardware or software depends on the specific applications of the technical solutions and the design constraints imposed on the system. Persons skilled in the art may use different methods to implement the described functions for each particular application, but it should not be considered that the implementation goes beyond the scope of this application.

In the several embodiments provided in this application, it should be understood that the disclosed apparatus/terminal device and method may be implemented in other manners. For example, the described apparatus/terminal device embodiment is merely an example. For example, division into the modules or units is merely a logical function division, and another division manner may be used during actual implementation. For example, a plurality of units or components may be combined, or may be integrated into another system, or some features may be ignored or not performed. In addition, the displayed or discussed mutual couplings or direct couplings or communications connections may be implemented by using some interfaces. The indirect couplings or communications connections between apparatuses or units may be implemented in electrical, mechanical, or other forms.

Units described as separate components may or may not be physically separate. A component displayed as a unit may be one or more physical units, and may be located in one place, or may be distributed in a plurality of places. Some or all of the units may be selected based on an actual requirement, to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

If the integrated modules/units are implemented in the form of a software function unit and is sold or used as an independent product, the integrated unit may be stored in a computer-readable storage medium. Based on this understanding, all or part of the processes of the method in the embodiments of this application may be implemented by a computer program instructing related hardware. The computer program may be stored in the computer-readable storage medium, and when the computer program is executed by a processor, the steps in the foregoing method embodiments may be implemented. The computer program includes computer program code, where the computer program code may be source code, object code, an executable file, some intermediate forms, or the like. The computer-readable medium may include: any entity or apparatus capable of carrying the computer program code, a recording medium, a USB flash disk, a mobile hard disk, a diskette, a compact disc, a computer memory, a read-only memory (ROM, Read-Only Memory), a random access memory (RAM, Random Access Memory), an electrical carrier signal, a telecommunication signal, a software distribution medium, or the like. It should be noted that the contents contained in the computer-readable medium can be appropriately increased or decreased according to the requirements of legislation and patent practice within the judicial jurisdiction. For example, in some jurisdictions, according to legislation and patent practice, computer-readable media do not include electrical carrier signals and telecommunication signals.

In conclusion, the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application, and should be included in the protection scope of this application.

What is claimed is:

1. A data processing method, implemented based on a data processing system comprising an access layer, a configuration layer, and a data layer, the method comprising:
   accessing, through the access layer, data under processing, the accessing, through the access layer, the data under processing comprising receiving, through the access layer, the data under processing from a device;
   obtaining, through the access layer, a message parsing script set by the configuration layer, and converting the data under processing into standard data; and
   obtaining, through the data layer, a device model set by the configuration layer, and mapping the standard data to a data table corresponding to the device model,
   wherein the obtaining, through the access layer, the message parsing script set by the configuration layer, and the converting the data under processing into standard data further comprises:
   obtaining, through the access layer, a routing rule for different versions of the message parsing script set by the configuration layer;
   routing, through the access layer according to the routing rule, the data under processing to two or more corresponding versions of the message parsing script for parsing; and
   evaluating a newer version of the message parsing script of the two or more corresponding versions of the message parsing script based on a comparison of parsing results from the two or more corresponding versions of the message parsing script.

2. The method according to claim 1, further comprising, before mapping the standard data to a data table corresponding to the device model:
   obtaining, through the data layer, a change message of the device model; and
   updating, through the data layer, the data table corresponding to the device model according to a change relationship between the change message of the device model and an existing device model, the data table being used for mapping of the standard data.

3. The method according to claim 2, wherein updating, through the data layer, the data table corresponding to the device model according to a change relationship between the change message of the device model and the existing device model comprises:
   determining, through the data layer, the change relationship between the change message of the device model and the existing device model; and
   performing an action based on the change relationship, comprising:
   when the change message of the device model is a change message of the existing device model, adding, through the data layer, a new field in an existing model table based on the change message of the device model, the existing model table being a data table mapped from the existing model; or
   when the change message of the device model is a change message of an unknown device model:
   creating, through the data layer, a data table based on the change message of the device model, or determining a new field based on the change message of the device model, and updating the data table according to the new field.

4. The method according to claim 3, further comprising, after determining, through the data layer, the change relationship between the change message of the device model and the existing device model:
when fields comprised in the change message of the device model are inherited from a basic model, adding, through the data layer, a new field in a basic model table based on the change message of the device model.

5. The method according to claim 3, further comprising, after obtaining, through the data layer, a change message of the device model:
determining a type of the change message of the device model based on a data identifier in the change message of the device model.

6. The method according to claim 1, wherein obtaining, through the access layer, the message parsing script set by the configuration layer, and converting the data under processing into standard data comprises:
identifying, through the access layer, a message header and message body in the data under processing;
converting, through the access layer, a message header and message body of the identified data according to the message parsing script set by the configuration layer; and
obtaining, through the access layer, the standard data based on the converted message.

7. The method according to claim 6, wherein obtaining, through the access layer, the standard data based on the converted message comprises:
obtaining, through the access layer, a constraint rule set by the configuration layer; and
validating, through the access layer according to the constraint rule, the data under processing, and determining the standard data based on data that passes the validation.

8. The method according to claim 6, wherein the obtaining the routing rule for the different versions of the message parsing script and the routing the data under processing to the corresponding version pf the message parsing script are performed after identifying, through the access layer, the message header and message body in the data under processing, and before converting, through the access layer, the message header and message body of the identified data according to the message parsing script set by the configuration layer.

9. The method according to claim 8, wherein:
the routing rule comprises a HASH value routing rule and/or a whitelist routing rule; and
routing, through the access layer according to the routing rule, the data under processing to a corresponding version of the message parsing script for parsing comprises:
determining, through the access layer based on a numerical range of a HASH value of a predetermined field in the data under processing, a corresponding version of the message parsing script for the data under processing; or
determining, through the access layer based on a whitelist corresponding to the version of the message parsing script, a corresponding version of the message parsing script for the data under processing.

10. The method according to claim 1, wherein accessing, through the access layer, the data under processing comprises:
accessing, through the access layer by using at least one of http protocol adaptation, csv import, mq real-time message access, oss docking, MinIO docking, and ftp docking, the data under processing.

11. The data processing method of claim 1, wherein the data under processing includes battery data.

12. A data processing apparatus, implemented based on a data processing system comprising an access layer, a configuration layer, and a data layer, the apparatus comprising:
an access unit, configured to access, through the access layer, data under processing, the accessing, through the access layer, the data under processing comprising receiving, through the access layer, the data under processing from a device;
a parsing unit, configured to: obtain, through the access layer, a message parsing script set by the configuration layer, and convert the data under processing into standard data; and
a mapping unit, configured to: obtain, through the data layer, a device model set by the configuration layer, and map the standard data to a data table corresponding to the device model, wherein the obtaining, through the access layer, the message parsing script set by the configuration layer, and the converting the data under processing into standard data further comprises:
obtaining, through the access layer, a routing rule for different versions of the message parsing script set by the configuration layer;
routing, through the access layer according to the routing rule, the data under processing to two or more corresponding versions of the message parsing script for parsing; and
evaluating a newer version of the message parsing script of the two or more corresponding versions of the message parsing script based on a comparison of parsing results from the two or more corresponding versions of the message parsing script.

13. A data processing device, comprising:
a processor; and
a memory storing a computer program that, when is executed by the processor, causes the processor to perform the method according to claim 1.

14. A non-transitory computer-readable storage medium storing a computer program that, when executed by a processor, causes the processor to perform the method according to claim 1.

* * * * *